(12) United States Patent  
Pomeranz

(10) Patent No.: US 7,733,926 B2  
(45) Date of Patent: Jun. 8, 2010

(54) THULIUM LASER PUMPED MID-IR SOURCE WITH BROADBANDED OUTPUT

(75) Inventor: Leonard A. Pomeranz, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 537 days.

(21) Appl. No.: 10/533,321

(22) PCT Filed: Jan. 29, 2004

(86) PCT No.: PCT/US2004/002478

§ 371 (c)(1),
(2), (4) Date: May 2, 2005

(87) PCT Pub. No.: WO2004/070895

PCT Pub. Date: Aug. 19, 2004

(65) Prior Publication Data

US 2005/0286603 A1    Dec. 29, 2005

Related U.S. Application Data

(60) Provisional application No. 60/444,541, filed on Feb. 3, 2003.

(51) Int. Cl.
*H01S 3/10* (2006.01)
(52) U.S. Cl. .......................... 372/21; 372/41; 372/23
(58) Field of Classification Search .................. 372/10, 372/13, 21, 41, 23
See application file for complete search history.

(56) References Cited

U.S. PATENT DOCUMENTS 4,965,803 A * 10/1990 Esterowitz et al. ............. 372/5

(Continued)

OTHER PUBLICATIONS

L. Pomeranz, P. Budni, P. Schunemann, T. Pollak, P. Ketteridge, I. Lee, and E. Chicklis, Efficient Power Scaling in the Mid-IR with a $ZnGeP_2$ OPO, OSA TOPS ASSL, vol. 10, pp. 259-261, 1997.

(Continued)

*Primary Examiner*—Minsun Harvey
*Assistant Examiner*—Michael Carter
(74) *Attorney, Agent, or Firm*—Daniel J. Long; Joseph E. Funk

(57) ABSTRACT

A Thulium laser (15) is used to directly drive a $ZnGeP_2$ optical parametric oscillator (30) with a nominal 2 μm output to generate the 3-5 micron wavelengths. In one embodiment, the ZGP OPO is configured as a linear resonator and in another embodiment the ZGP OPO is configured as a ring resonator. The ring resonator prevents optical feedback to the Thulium laser (15) and eliminates the need for an optical isolator (24). Moreover, the Thulium laser pump (15) is implemented as a $Tm:YAlO_3$ laser in which YAlO is the host for the Thulium YAlO is particularly beneficial as it is a mechanically hard optical material allowing high thermal loading without fracture as well as natural birefringence that can minimize thermal birefringence losses. A longer wavelength transition at 1.99 microns is selected to minimize nonlinear crystal loss. More particularly, a high power, high efficiency $Tm:YAlO_3$ laser repetitively Q-switched at 10 kHz is used to drive a $ZnGeP_2$ OPO. The system is run with room temperature components and achieves over 3 W at 3-5 microns with an efficiency of 5% starting from the pump diode. A two crystal resonator (40, 42) design allows tuning over multiple spectral peaks or alternately as an ultra broad spectral source.

14 Claims, 3 Drawing Sheets

U.S. PATENT DOCUMENTS

| | | | | |
|---|---|---|---|---|
| 5,272,708 | A | * | 12/1993 | Esterowitz et al. ............ 372/20 |
| 5,854,802 | A | * | 12/1998 | Jin et al. ....................... 372/22 |
| 6,044,094 | A | * | 3/2000 | Govorkov ..................... 372/21 |
| 6,162,213 | A | * | 12/2000 | Stewart ........................ 606/10 |
| 6,215,800 | B1 | * | 4/2001 | Komine ........................ 372/22 |
| 6,358,243 | B1 | * | 3/2002 | Esterowitz et al. ............ 606/10 |
| 6,404,785 | B1 | * | 6/2002 | Scheps ......................... 372/21 |
| 6,647,033 | B1 | * | 11/2003 | Smith et al. .................. 372/21 |
| 2002/0133146 | A1 | * | 9/2002 | Telfair et al. ................... 606/5 |

OTHER PUBLICATIONS

P. Budni, L. Pomeranz, M. Lemons, P. Schunemann, T. Pollak, and E. Chicklis, 10W Mid-IR Holmium Pumped $ZnGeP_2$ OPO, OSA TOPS ASSL, vol. 19, pp. 226-229, 1998.

C. Nabors, J. Ochoa, T. Fan, A. Sanchez, H. Choi, and G. Turner, Ho:YAG Laser Pumped by 1.9-μm Diode Lasers, IEEE Journal of Quantum Electronics, vol. 31, No. 9, pp. 1603-1605, Sep. 1995.

P. Budni, L. Pomeranz, C. Miller, B. Dygan, M. Lemons, and E. Chicklis, CW and Q-switched Ho:YAG pumped by Tm:YALO, OSA TOPS ASSL, vol. 19, pp. 204-206, 1998.

I. Elder and M. Payne, Comparison of diode-pumped Tm:YAP with Tm:YAG, OSA TOPS ASSL, vol. 19, pp. 212-217, 1998.

R. Stoneman and L. Esterowitz, Efficient 1.94-μm Tm:YALO Laser, IEEE Journal of Selected Topics in Quantum Electronics, vol. 1, No. 1, pp. 78-81, Apr. 1995.

G. Wagner and T. Carrig, Power Scaling of $Cr^{2+}$: ZnSe Lasers, OSA TOPS ASSL, vol. 50, pp. 506-510, 2001.

G. Arisholm, E. Lippert, G. Rustad, and K. Stenersen, Effect of resonator length on a doubly resonant optical parametric oscillator pumped by a multilongitudinal-mode beam, Optical Society of America, Optics Letters, vol. 25, No. 22, pp. 1654-1656, Nov. 15, 2000.

S. Setzler, G. Rines, P. Budni, and D. Rines, Efficient $ZnGeP_2$ optical parametric oscillator in a doubly resonant ring resonator, OSA TOPS ASSL, vol. 68, pp. 85-87, 2002.

* cited by examiner

THULIUM LASER PUMPED MID-IR SOURCE WITH BROADBANDED OUTPUT

CROSS REFERENCE TO RELATED APPLICATION

This application claims rights under 35 USC §119 (e) from U.S. application Ser. No. 60/444,541; filed Feb. 3, 2003, the contents of which are incorporated herein by reference.

FIELD OF THE INVENTION

The present invention relates to lasers and more particularly to infrared and far-infrared lasers.

BACKGROUND OF THE INVENTION

Coherent radiation sources operating in the middle infrared transmission window are the subjects of ongoing research due to their usefulness in such a wide variety of applications. High peak power, high repetition rate pulsed Mid-IR lasers are in particular desired for uses such as remote sensing, chemical/pollutants detection, military systems, and nondestructive testing of materials, to name a few. It is highly desirable to have an optical system that is lightweight, compact, and requires minimum electrical input power.

Traditional paths to obtain spectral lines in the 3 to 5 micron wavelength region include gas and chemical lasers, frequency doubling of $CO_2$ lasers, optically pumping a few semiconductor materials, and optical parametric oscillators pumped by one and two micron lasers. Chemical reaction lasers require handling of corrosive and toxic materials and this limits their practical use in a compact device and remote installations. Gas lasers excited by radio frequency sources suffer from low overall system efficiency (approximately 1%) and contribute only a single line in the band of interest. Semiconductor lasers also generate only limited spectral lines. These lasers, while simple in architecture, have to date required cryogenic cooling in order to generate moderate average powers and have been limited in their ability to generate peak power to kilowatt levels without suffering damage to their gain media.

The most efficient, compact, and versatile Mid-IR sources have been made using solid state lasers driving nonlinear optical converters. Laser transitions of the Neodymium (Nd) and Holmium (Ho) ion, at the one micron and two micron wavelength ranges respectively, have been used to pump nonlinear optical materials in various configurations. One such configuration called an optical parametric oscillator (OPO) can be used to convert their pump wavelength to two longer wavelengths in the infrared region. Note that inherent in the phase matching process of the OPO is the versatility to tune the longer wavelengths, called the signal and idler wavelength, by adjustment of crystal angle or temperature. The nonlinear process is driven by high electric field intensities. These high fields are generated typically with high peak power pulses from a Q-switched laser. In order to generate similar power levels with a continuous wave laser it must be focused much tighter, often causing unwanted thermal affects as well as limiting the interaction length by walk off.

The Neodymium laser is a more efficient continuous wave device compared to the Holmium laser in that it is a four level system and does not require cooling. It reaches threshold at low pump power levels and due to its large emission cross section, it can generate high gain, allowing narrow pulses when Q-switched. The one micron laser is at a disadvantage to a two micron laser though due to its shorter upper state lifetime. The two micron laser with its longer storage lifetime can generate much higher pulse energies for the same pump power than the one micron laser. The high pulse energies are required to drive the nonlinear process to generate Mid-IR power.

A one micron laser requires two OPO stages in order to convert most of its energy to the three to five micron range, and the extra converter reduces overall system efficiency and increases system complexity. Comparing one and two micron lasers, a single optical parametric oscillator stage is most efficiently pumped by a two micron laser since both the signal and idler waves will be located in the three to five micron Mid-IR region. In addition, the two micron laser can be used as a pump source for several nonlinear optical materials that are too absorbing when pumped by a one micron laser. By use of a material with a large non-linear coefficient, the laser line can be converted to the mid band range with good conversion efficiency. Zinc Germanium Phosphide ($ZnGeP_2$) has near the highest $D_{eff}$ of all nonlinear crystals. Due to the crystal's loss near Nd based laser emission lines, the best choice for a pump laser base to generate the 3-5 micron light lies with a two micron solid state laser.

In the past several two micron lasers have been used for such a purpose as is disclosed in L. Pomeranz, P. Budni, P. Schunemann, T. Pollak, P. Ketteridge, I. Lee, and E. Chicklis, OSA TOPS ASSL, Vol. 10, pp. 259-261, 1997; and P. Budni, L. Pomeranz, M. Lemons, P. Schunemann, T. Pollak, and E. Chicklis, OSA TOPS ASSL, Vol. 19, pp. 226-229, 1998. In these lasers the Holmium ions were sensitized by co-doping with Thulium (Tm) ions. Introducing Thulium ions allows pumping with a readily available high power GaAs laser diode emitting in the range of 780 to 795 nm dependent on the host crystal. The diode pump light is highly absorbed by the Thulium ions and undergoes an efficient cross relaxation process which generates two higher energy state Thulium ions for each diode pump photon. In turn the two Thulium ions will transfer their energy to two Holmium ions, which allows high overall conversion of pump photons to two micron photons.

Original methods based on pulsed Thulium sensitized Holmium systems suffered for need of sufficient cooling requirements. The Holmium laser performance depends on temperature sensitive upconversion and Thulium to Holmium energy transfer processes. At room temperature the energy transfer is not complete and there is a reduction in the effective energy storage lifetime of Holmium. To improve the gain and allow sufficient extraction of high peak power pulses the laser crystal must be cooled.

More recent methods of resonantly pumping Holmium lasers with 1.9 micron sources circumvents the major cooling needs but adds substantial optical complexity as is described in C. Neabors, J. Ochoa, T. Fan, A. Sanchez, H. Choi, and G. Turner, IEEE J.Q.E., Vol. 31, pp. 1603-1605, 1995; and P. Budni, L. Pomeranz, C. Miller, B. Dygan, M. Lemons, and E. Chicklis, OSA TOPS ASSL, Vol. 19, pp. 204-206, 1998. If one could avoid using either Thulium sensitized Holmium or the Holmium laser to pump the optical parametric oscillator a simpler, more efficient mid-IR source could be achieved.

SUMMARY OF INVENTION

The simplicity required has been achieved by using a Thulium laser by itself to pump the optical parametric oscillator which produces the mid-IR output, thus avoiding the use of either a Thulium sensitized Holmium system or a Holmium laser. The Thulium laser is less impacted by the upconversion losses found in the co-doped Thulium-Holmium laser and can run at a higher crystal temperature. Thulium does have a lower stimulated emission cross-section which leads to lower gain. At high pulse repetition rates this leads to longer Q-switched pulse widths. Thus while the gain in Thulium is lower than in Holmium-Thulium systems resulting in wide pulse widths of tens to hundreds of nanoseconds at kilohertz pulse rates, it has now been found that the Thulium laser can drive the optical parametric oscillator hard enough to generate Mid-IR output when using improved zinc geranium oxide crystals in the optical parametric oscillator.

New techniques for fabricating the $ZnGeP_2$ crystals make the crystal less lossy so that it be pumped at the shorter wavelengths associated with Thulium as opposed to Holmium. The Holmium laser wavelengths are host dependent and range from 2.05 to 2.15 microns. The Thulium laser wavelength depends on the crystal host the Tm ions are doped into. Useable host materials include YAG, YSGG, YALO, LuAG, YLF, $Y_2O_3$, and $YVO_4$. The energy transition occurs between the $^3H_4$ and the $^3H_6$ levels. The laser wavelength will be in the range from 1.91 to 2.03 microns and can be tuned. Also longer $ZnGeP_2$ crystals can now be made. This provides crystals with more gain for conversion. Thus, for the first time it was recognized that with an improved lower loss crystal with improved gain one can utilize the lower gain Thulium laser output and use it to pump a $ZnGeP_2$ OPO. This results in significantly reduced input power and means that one does not need to use a more complicated Holmium-Thulium system which has to be cooled. Additionally, one can pump other non-linear crystals than zinc germanium phosphide. Other crystals include silver gallium selenide (AgGaSe2), silver gallium indium selenide (AGIS), silver gallium sulfide (AgGaS2), optically patterned gallium arsenide (OPGaAs), and periodically poled lithium niobate (PPLN).

However, zinc germanium phosphide has the highest combination of $D_{eff}$ performance factor, which is used to measure the nonlinearity of a crystal, good optical quality, and low loss. When one has a non linear crystal with good optical properties, low loss, and high $D_{eff}$ one can achieve high conversion efficiency when used in an optical parametric oscillator. One would like that the non-linear conversion process go on with the light used in the phase matching process as opposed to in a thermal process such as absorption. When one has thermal processes going on in a material one ends up with a degraded output. The result can be thermal lensing or a change in phase matching conditions. Normally, one wants the signal and idler to phase match the pump. Using a material with good optical properties, low loss, and a high $D_{eff}$ optimizes the process.

In summary a Thulium laser is used to directly drive a $ZnGeP_2$ optical parametric oscillator with a nominal 2 μm output to generate the 3-5 micron wavelengths. In one embodiment, the ZGP OPO is configured as a linear resonator and in another embodiment the ZGP OPO is configured as a ring resonator. The ring resonator prevents optical feedback to the Thulium laser and eliminates the need for an optical isolator. Moreover, the Thulium laser pump is implemented as a Tm:$YAlO_3$ laser in which YAlO is the host for the Thulium. YAlO is particularly beneficial as it is a mechanically hard optical material allowing high thermal loading without fracture as well as natural birefringence that can minimize thermal birefringence losses. A longer wavelength transition at 1.99 microns is selected to minimize nonlinear crystal loss. More particularly, in one embodiment a high power, high efficiency Tm:$YAlO_3$ laser repetitively Q-switched at 10 kHz is used to drive a $ZnGeP_2$ OPO. The system is run with room temperature components and achieves over 3 W at 3-5 microns with an efficiency of 5% starting from the pump diode. A two crystal resonator design allows tuning over multiple spectral peaks or alternately as an ultra broad spectral source.

BRIEF DESCRIPTION OF THE DRAWINGS

The present invention is further described with reference to the accompanying drawings wherein.

DETAILED DESCRIPTION

Figure 1:
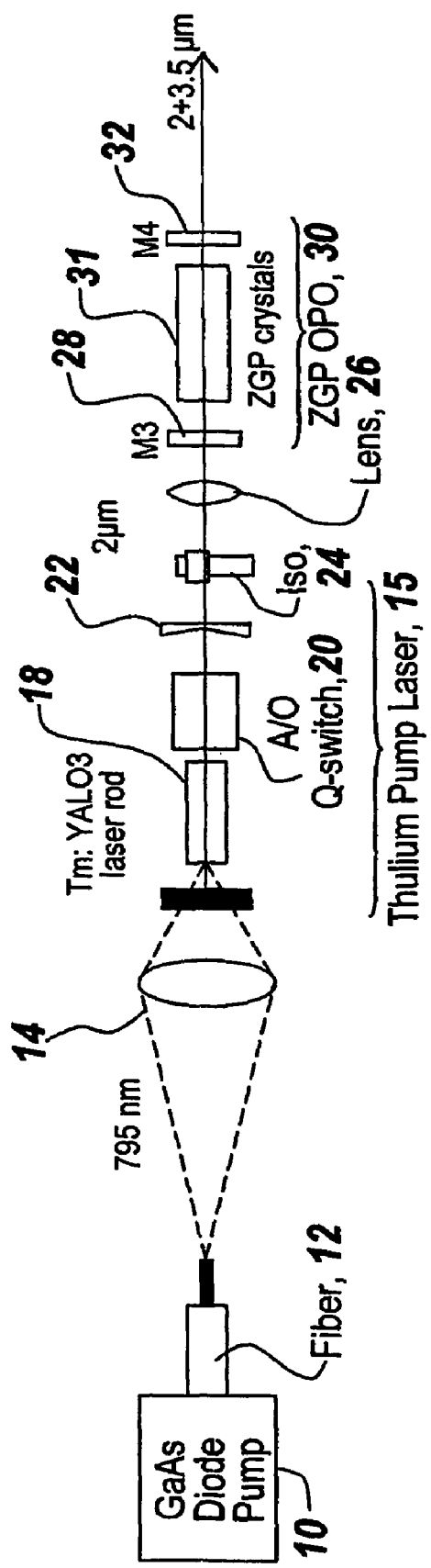
FIG. 1 is a schematic diagram showing a preferred embodiment of the mid IR laser of the present invention.

Referring now to FIG. 1, GaAs diodes provide a pump 10 coupled through a fiber 12 that is focused by a lens set 14 into a Thulium pump laser 15. Laser 15 includes an input mirror 16 and a Tm:$YAlO_3$ laser rod 18 followed by an acousto-optical modulator or Q-switch 20 and an output mirror 22.

The output of Thulium laser pump 15 is coupled through an isolator 24 and a lens system 26 into a zinc germanium phosphide optical parametric oscillator 30. This optical parametric oscillator includes an input mirror 28, one or more ZGP crystals 31, and an output mirror 32.

Pump 10 outputs 795 nanometer pump pulses which are injected into laser rod 18. The output from mirror 22 is a 2 micron beam which is used to pump OPO 30. Specifically, the output from mirror 22 is 1.99 microns.

The net result is a broadband spectrum at 2 microns and 3-5 microns. This broadband result in the mid infrared is accomplished with a simple Q-switched Thulium laser which avoids the problems of Holmium or Thulium-doped Holmium lasers. More specifically, a Tm:$YAlO_3$ laser serves as the linear pump stage for the $ZnGeP_2$ nonlinear converter. FIG. 1 depicts the optical schematic of the laser system. Quasi-three level Tm based systems offer high efficiency comparable with Nd systems when pumped with 785-795 nm sources due to the cross relaxation process that occurs between adjacent ions. The Thulium ion has been employed as the dopant in many host crystals from oxides to fluorides, allowing one to take advantage of the specific attributes of each. Thulium doped into the yttrium aluminum perovskite crystal was used in the apparatus of FIG. 1. $YAlO_3$ has the beneficial properties of hardness (similar to YAG) allowing high average thermal loading without mechanical fracture, yet has natural birefringence with which it can minimize thermally induced birefringence losses. These properties are discussed in I. Elder and M. Payne, OSA TOPS ASSL, Vol. 19, pp. 212-217, 1998. In addition, due to the relative values of the cross sections for each of its three axes, the properly cut crystal can allow the laser to be spectrally tuned by variation of the reflector. Such tuning is described in R. Stoneman and L. Esterowitz, IEEE Sel. Top. Q.E. vol. 1., pp. 78-81, 1995. The output spectrum of the Thulium laser was found to be close to 1.99 microns for the apparatus of FIG. 1.

Thulium laser 15 was diode end pumped and repetitively Q-switched. During the diode 10 pulse period over 50 watts of 795 nm light was coupled through fiber 12 and imaged into the 9 mm rod 18 via lens set 14. The pump spot was approximately 650 microns in diameter and produced on axis pump intensities of 16 KW/cm2. Rod 18 absorbed approximately 90% of the pump in one pass. The laser crystal's copper heat sink was maintained at 12.5 C. Accousto-optic modulator 20 in the resonator was driven at 10 kHz and extracted Q-switch pulses while the diode pump pulse was on. Note that it has been found that the pulse repetition frequency can be lowered below 10 kHz and can be as low as 100 Hz in one embodiment. The resonator was 25 mm long with flat high reflector 16 and 10 cm partial reflector 22. The high reflector was coated for high transmission of the diode and high reflection of the laser. The output coupler in the form of mirror 22 was 90% reflective at two microns.

Figure 2:
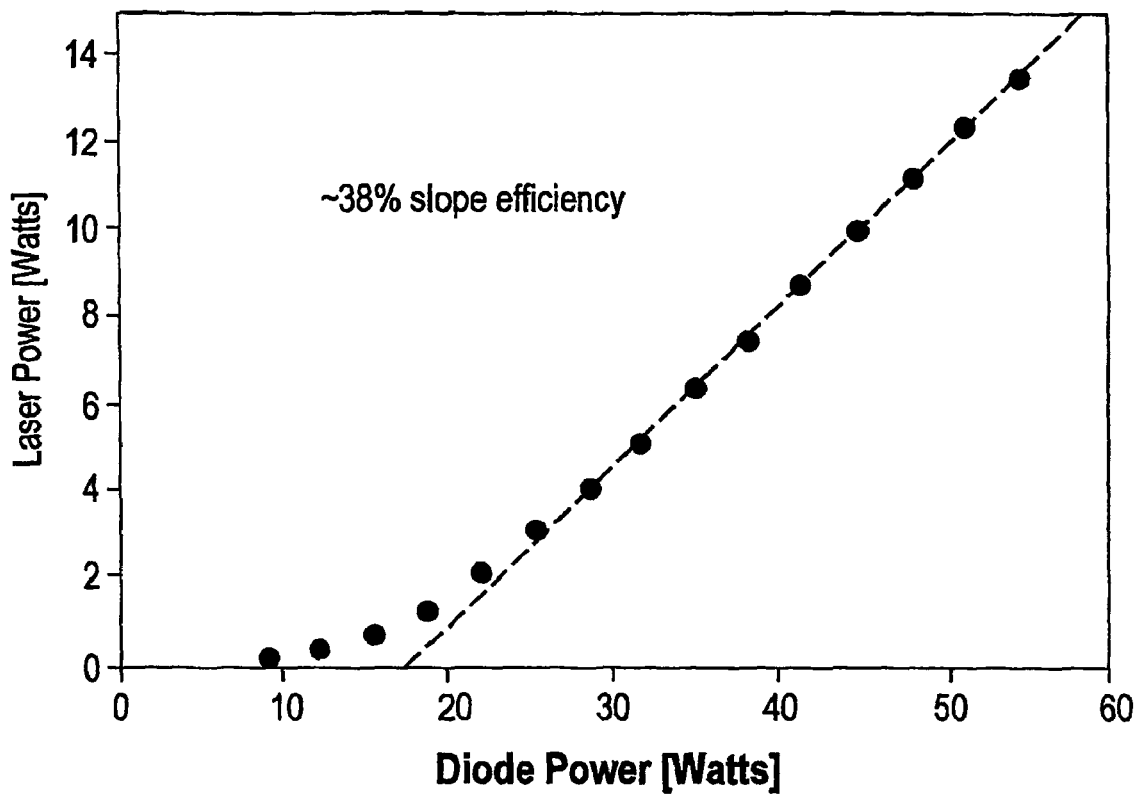
FIG. 2 is a graph showing Q-switched:$YAlO_3$ Laser Power versus Diode Pump Power in a preferred embodiment of the present invention.

The performance of the Thulium laser is shown in FIG. 2. The maximum obtainable power was about 14 watts limited by the diode drive. A slope efficiency of 38% was extracted from the least square fit of the data points with an overall optical-to-optical conversion efficiency of 26%. The laser produced a train of pulses measuring approximately 50 ns (FWHM) on average. Thermal lensing values were measured to be >10 cm thus not destabilizing the resonator. The beam propagation factor was measured using apertures at several beam locations, and the data was curve fit to a value $M^2 \sim 2.65$.

The two micron laser pulse train was collimated, relayed through isolator 24 and some diagnostics elements and then focused by lens 26 into the $ZnGeP_2$ crystal 31. OPO 30 was configured as a Doubly Resonant Oscillator (DRO). Approximately 10 watts of pump (1 mJ pulses) reached the crystal. The pump spot size was kept at approximately 600 microns to limit fluence levels. Pump powers up to 14 $MW/cm^2$ were achievable. In one set of experiments single and double crystals are employed in the linear resonator. The $ZnGeP_2$ crystals were cut for Type I phase matching. The measured total loss of the crystals used with the laser external to a cavity was found to be approximately 0.17 $cm^{-1}$. Crystals used were 20 to 25 mm in length, with the resonator being made as short as possible. The resonator configuration was flat/flat and mirror coatings were designed for doubly resonant oscillation. Input mirror 23 was coated for high transmission at two microns and high reflection from three to five microns. Output mirror 32 was varied, typically in the range of 50 to 80% reflectivity at the signal and idler wavelengths.

Figure 3:
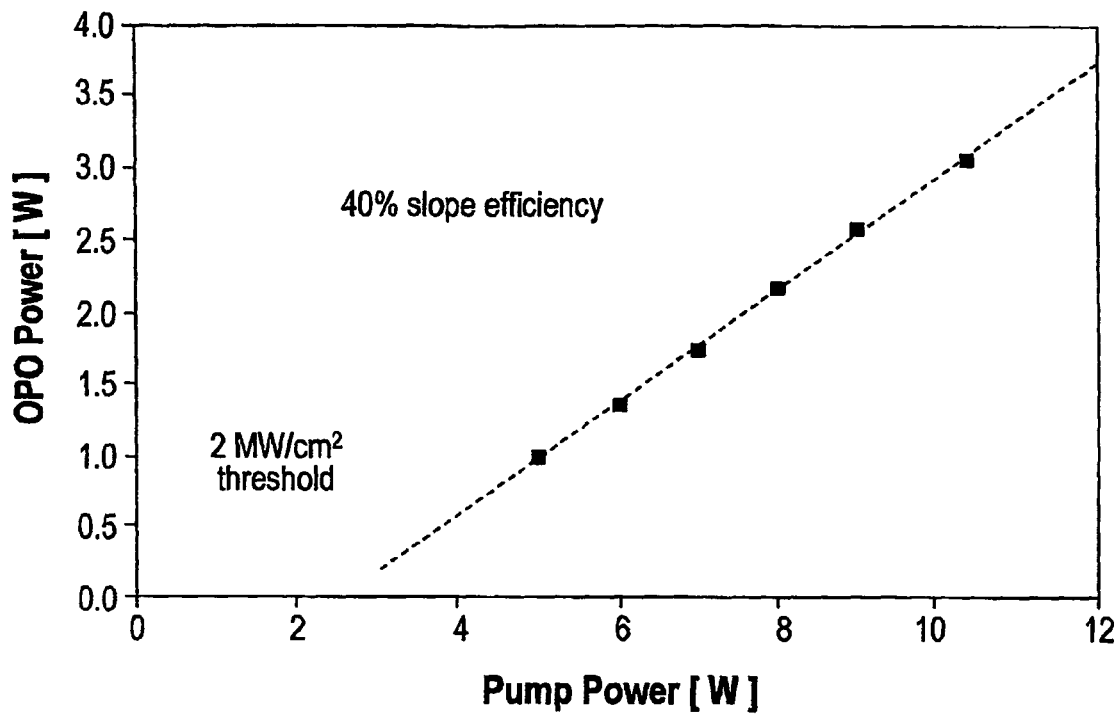
FIG. 3 is a graph of ZGP OPO Power vs. Laser Drive Power in a preferred embodiment to the present invention; and, FIG. 4 is a schematic illustration of an optical parametric oscillator using a two crystal resonator.

For the single crystal resonator over 3.1 watts was achieved in the signal and idler beam, converting at 30% with a linear slope of 40% as shown in FIG. 3. The threshold level for the single crystal was near 2 $MW/cm^2$. At the maximum operating point the power level was quite stable. The output beam was observed with a pyro electric camera and appeared to be a symmetric and near TEMoo mode.

The DRO spectrum was tuned from near degeneracy at four microns out to the limits imposed by the mirror coatings at near 3.3 and 5 microns. This type of resonator is characterized by broad spectral lobes, created by the shifting signal and idler pairs and the phase matching with the multi longitudinal-mode pump beam. Such a resonator is described by G. Arisholm, E. Lippert, G. Rustad, and K. Stenersen in Opt. Lett. vol. 25, pp. 1654-1656, 2000. The typical width is over 100 nm (FWHM) and several hundred nanometers near degeneracy.

Experiments were conducted using more than a single crystal in the resonator. The use of two crystals in opposing orientation allows walk off compensation between the pump and the signal and idler beams as well as a two-fold increase in the interaction length.

A lower threshold was observed for the same output coupler used with a single crystal. Typically a worse slope was believed due to not out coupling enough of the resonant field. One advantage of a second crystal is the ability to tune the individual outputs to separate wavelengths. Once the crystals are tuned apart, the output of each signal and idler wave will drop but there is enough gain to run both sets. The device was tuned such that the spectrum consisted of a nearly continuous white light source from 3.3 through 4.7 microns.

Figure 4:
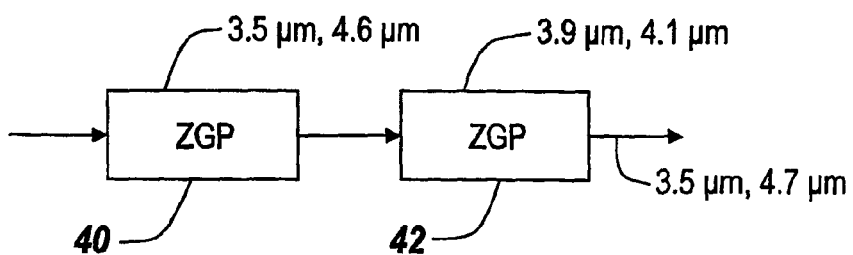

While the subject invention has been described in terms of an optical parametric oscillator having a single ZGP crystal referring to FIG. 4, a two crystal resonator having two ZGP crystals 40 and 42 may be used in a ring laser configuration. ZGP crystal 40 has a signal and idler respectively at 3.5 microns and 4.6 microns. ZGP crystal 42 has a signal at 3.9 microns and an idler at 4.1 microns.

The resultant output of such a tandem arrangement is an output from 3.5 microns to 4.7 microns making this mid infrared source truly broadband.

In summary a high power source in the mid-IR region is provided based on a simple architecture of pumping an optical parametric oscillator with a simple Thulium laser.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of pumping a wide bandwidth optical parametric oscillator to provide mid-IR radiation output, comprising the step of pumping the optical parametric oscillator with a Thulium laser using a laser wavelength of about 2 microns and operating by itself as a pump source for the optical parametric oscillator, wherein the optical parametric oscillator includes two zinc germanium phosphide non-linear crystals, wherein each of the crystals generates a signal beam and an idler beam that are all part of the output from the optical parametric oscillator, and wherein the signal beams and idler beams generate four distinct wavelengths.

2. The method of claim 1, wherein the Thulium laser utilizes a $YAlO_3$ host.

3. The method of claim 1, wherein the Thulium laser is Q-switched.

4. A method of pumping an optical parametric oscillator without utilizing Holmium, comprising the step of pumping the optical parametric oscillator with a Thulium laser using a laser wavelength of about 2 microns output, wherein the optical parametric oscillator includes two zinc germanium phosphide crystals, and wherein each of the crystals generates a signal beam and an idler beam, wherein each of said crystals generates a signal beam and an idler beam that are all part of an output from the optical parametric oscillator, and wherein the signal beams and idler beams generate four distinct wavelengths.

5. Apparatus for generating infrared radiation, comprising the combination of:
   a Thulium laser using a laser wavelength of about 2 microns; and
   an optical parametric oscillator pumped by said Thulium laser, wherein said optical-parametric oscillator is in the form of a ring, wherein said optical parametric oscillator includes two ZnGeP2 non-linear crystals, and wherein the two ZnGeP2 non-linear crystals are configured to generate four distinct wavelengths.

6. The apparatus of claim 5, wherein said Thulium laser is a Tm:$YAlO_3$ laser.

7. The apparatus of claim 5, wherein said optical parametric oscillator is doubly resonant.

8. The apparatus of claim 5, wherein said optical parametric oscillator has a non-linear crystal selected from the group consisting of zinc germanium phosphide, silver gallium selenide, silver gallium indium selenide, gallium arsenide and lithium niobate crystals.

9. The apparatus of claim 5, wherein said Thulium laser is selected from the group consisting of YAG, YSGG, PALO, LuAG, YU, $Y_2O_3$ and $YVO_4$ Thulium lasers.

10. The apparatus of claim 5, wherein the optical parametric oscillator has a non-linear crystal selected from the group consisting of $ZnGeP_2$, $AgGaSe_2$ AGIS $AgGaS_2$, OPGaAs and PPLN non-linear crystals.

11. Apparatus for generating infrared radiation, comprising the combination of:

a Thulium laser using a laser wavelength of about 2 microns; and an optical parametric oscillator pumped by said Thulium laser wherein said optical parametric oscillator is double resonant, wherein said optical parametric oscillator includes two ZnGeP2 non-linear crystals, and wherein the two ZnGeP2 non-linear crystals are configured to generate four distinct wavelengths.

12. The apparatus of claim 11, wherein said Thulium laser is a $Tm:YAlO_3$ laser.

13. The apparatus of claim 11, wherein said optical parametric oscillator is in the form of a ring.

14. The apparatus of claim 11, wherein said optical parametric oscillator is in the form of a linear resonator.

* * * * *